United States Patent
Okuma

(10) Patent No.: US 9,720,635 B2
(45) Date of Patent: Aug. 1, 2017

(54) INFORMATION PROCESSING APPARATUS, METHOD OF CONTROLLING THE SAME, NON-TRANSITORY COMPUTER READABLE STORAGE MEDIUM, AND INFORMATION PROCESSING SYSTEM

(71) Applicant: CANON KABUSHIKI KAISHA, Tokyo (JP)

(72) Inventor: Satoshi Okuma, Moriya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/887,429

(22) Filed: Oct. 20, 2015

(65) Prior Publication Data
US 2016/0124693 A1    May 5, 2016

(30) Foreign Application Priority Data
Nov. 4, 2014  (JP) ................................. 2014-224621

(51) Int. Cl.
*G06F 3/12*  (2006.01)

(52) U.S. Cl.
CPC .......... *G06F 3/1275* (2013.01); *G06F 3/1204* (2013.01); *G06F 3/1205* (2013.01); *G06F 3/1273* (2013.01); *G06F 3/1285* (2013.01)

(58) Field of Classification Search
USPC ....................................................... 358/1.15
See application file for complete search history.

(56) References Cited

U.S. PATENT DOCUMENTS

2010/0238469 A1* 9/2010 Nakagama ........... G06K 15/005
                                                    358/1.9
2011/0317210 A1* 12/2011 Toyama ................ G06F 3/1218
                                                    358/1.15

FOREIGN PATENT DOCUMENTS

JP           2008311941 A      12/2008

* cited by examiner

*Primary Examiner* — Saeid Ebrahimi Dehkord
(74) *Attorney, Agent, or Firm* — Rossi, Kimms & McDowell LLP

(57) ABSTRACT

An information processing apparatus comprises: an editing unit that accepts editing of a workflow formed by a plurality of jobs which are to be processed in one or a plurality of job processing apparatuses; an obtaining unit that obtains pieces of history information from the processed jobs; an extraction unit that extracts, from the obtained pieces of history information, a series of jobs having a job type arrangement in common with a job of interest out of the plurality of jobs forming the edited workflow and at least one of the jobs preceding or succeeding the job of interest; and a setting unit that sets a setting, selected by a user out of the displayed settings, as the setting of the job of interest.

15 Claims, 13 Drawing Sheets

FIG. 5

| No. | DAY | TIME | PROCESSING TYPE | EXECUTOR | SETTING 1 | SETTING 2 | SETTING 3 | SETTING 4 | ... |
|---|---|---|---|---|---|---|---|---|---|
| 1 | 2014/7/1 | 9:00 | SCAN AND TRANSMISSION | USER A | Email TRANSMISSION | aaa@xxx.com | 300dpi | DOUBLE-SIDED READING | ... |
| 2 | 2014/7/1 | 10:00 | SCAN AND TRANSMISSION | USER B | Email TRANSMISSION | bbb@xxx.com | 300dpi | SINGLE-SIDE READING | ... |
| 3 | 2014/7/1 | 10:05 | COPY | USER B | NUMBER OF COPIES: 1 | DOUBLE-SIDED PRINTING: ON | MAGNIFICATION: 100% | AUTOMATIC PAPER SELECTION | ... |
| 4 | 2014/7/1 | 13:00 | COPY | USER B | NUMBER OF COPIES: 1 | DOUBLE-SIDED PRINTING: ON | MAGNIFICATION: 100% | AUTOMATIC PAPER SELECTION | ... |
| 5 | 2014/7/1 | 15:00 | COPY | USER B | NUMBER OF COPIES: 1 | DOUBLE-SIDED PRINTING: ON | MAGNIFICATION: 100% | AUTOMATIC PAPER SELECTION | ... |
| 6 | 2014/7/1 | 15:30 | SCAN AND TRANSMISSION | USER A | Email TRANSMISSION | ccc@xxx.com | 300dpi | DOUBLE-SIDED READING | ... |
| 7 | 2014/7/1 | 15:40 | COPY | USER A | NUMBER OF COPIES: 1 | DOUBLE-SIDED PRINTING: OFF | MAGNIFICATION: 100% | AUTOMATIC PAPER SELECTION | ... |
| 8 | 2014/7/1 | 15:30 | SCAN AND TRANSMISSION | USER A | Email TRANSMISSION | ccc@xxx.com | 300dpi | DOUBLE-SIDED READING | ... |
| 9 | 2014/7/1 | 15:40 | SCAN AND TRANSMISSION | USER A | Email TRANSMISSION | aaa@xxx.com | 300dpi | SINGLE-SIDE READING | ... |
| 10 | 2014/7/1 | 16:00 | COPY | USER B | NUMBER OF COPIES: 1 | DOUBLE-SIDED PRINTING: ON | MAGNIFICATION: 100% | AUTOMATIC PAPER SELECTION | ... |
| 11 | 2014/7/2 | 9:00 | SCAN AND TRANSMISSION | USER A | Email TRANSMISSION | aaa@xxx.com | 300dpi | DOUBLE-SIDED READING | ... |
| 12 | 2014/7/2 | 12:00 | SCAN AND TRANSMISSION | USER A | Email TRANSMISSION | aaa@xxx.com | 300dpi | SINGLE-SIDE READING | ... |
| 13 | 2014/7/2 | 12:10 | COPY | USER A | NUMBER OF COPIES: 1 | DOUBLE-SIDED PRINTING: ON | MAGNIFICATION: 100% | AUTOMATIC PAPER SELECTION | ... |
| 14 | 2014/7/2 | 10:05 | COPY | USER B | NUMBER OF COPIES: 1 | DOUBLE-SIDED PRINTING: ON | MAGNIFICATION: 100% | AUTOMATIC PAPER SELECTION | ... |
| 15 | 2014/7/2 | 10:00 | SCAN AND TRANSMISSION | USER B | Email TRANSMISSION | bbb@xxx.com | 300dpi | SINGLE-SIDE READING | ... |
| 16 | 2014/7/2 | 12:00 | COPY | USER B | NUMBER OF COPIES: 1 | DOUBLE-SIDED PRINTING: ON | MAGNIFICATION: 100% | AUTOMATIC PAPER SELECTION | ... |
| 17 | 2014/7/5 | 15:00 | COPY | USER B | NUMBER OF COPIES: 1 | DOUBLE-SIDED PRINTING: ON | MAGNIFICATION: 100% | AUTOMATIC PAPER SELECTION | ... |
| ... | | | | | | | | | |

F I G. 8
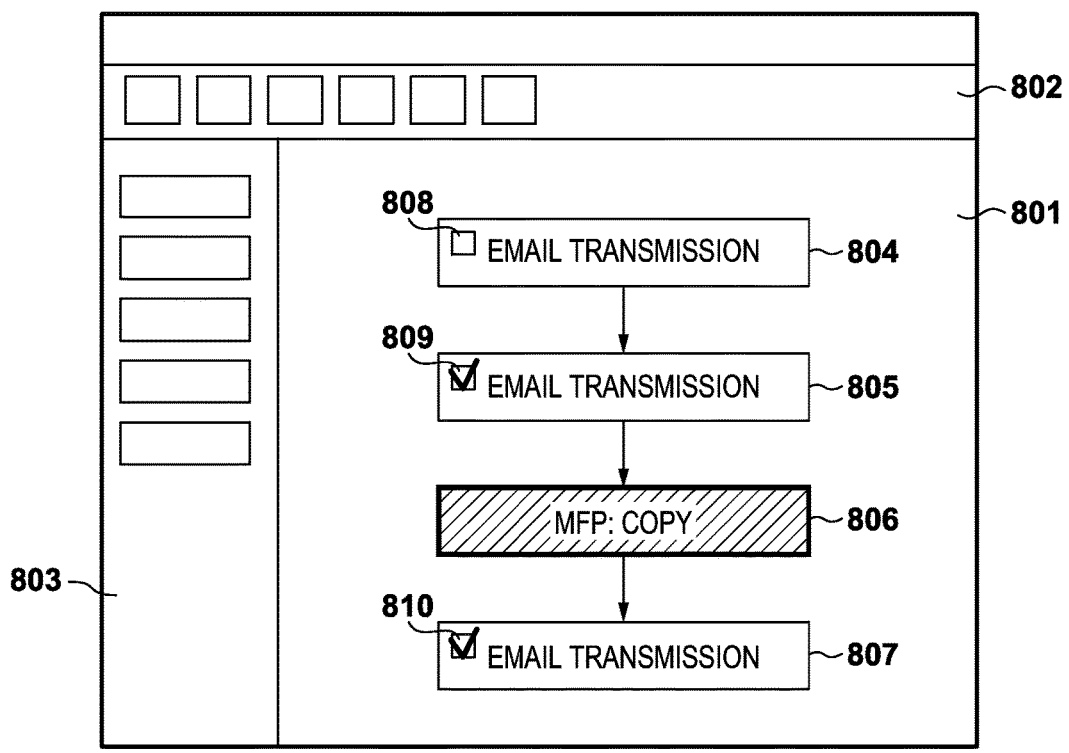

FIG. 9

| No. | DAY | TIME | DEVICE | PROCESSING TYPE | EXECUTOR | SETTING 1 | SETTING 2 | SETTING 3 | SETTING 4 | ... |
|---|---|---|---|---|---|---|---|---|---|---|
| 1 | 2014/7/1 | 9:00 | MFP1 | SCAN AND TRANSMISSION | USERA | Email TRANSMISSION | aaa@xxx.com | 300dpi | DOUBLE-SIDED READING | ... |
| 2 | 2014/7/1 | 10:00 | MFP1 | SCAN AND TRANSMISSION | USERB | Email TRANSMISSION | bbb@xxx.com | 300dpi | SINGLE-SIDE READING | ... |
| 3 | 2014/7/1 | 10:05 | MFP1 | COPY | USERB | NUMBER OF COPIES: 1 | DOUBLE-SIDED PRINTING: ON | MAGNIFICATION: 100% | AUTOMATIC PAPER SELECTION | ... |
| 4 | 2014/7/1 | 10:30 | PC1 | Email TRANSMISSION | USERA | ccc@xxx.com | ddd@xxx.com | - | FYI | ... |
| 5 | 2014/7/1 | 12:45 | PC2 | Email TRANSMISSION | USERB | eee@xxx.com | - | - | AUTHENTICATION REQUEST | ... |
| 6 | 2014/7/1 | 13:00 | MFP1 | COPY | USERB | NUMBER OF COPIES: 1 | DOUBLE-SIDED PRINTING: ON | MAGNIFICATION: 100% | AUTOMATIC PAPER SELECTION | ... |
| 7 | 2014/7/1 | 13:10 | PC2 | Email TRANSMISSION | USERB | fff@xxx.com | - | - | SUBMISSION | ... |
| 8 | 2014/7/1 | 14:00 | PC2 | FILE COPY | USERB | /xxx/abc.pdf | /yyy/abc.pdf | - | - | ... |
| 9 | 2014/7/1 | 15:00 | MFP1 | COPY | USERB | NUMBER OF COPIES: 1 | DOUBLE-SIDED PRINTING: ON | MAGNIFICATION: 100% | AUTOMATIC PAPER SELECTION | ... |
| 10 | 2014/7/1 | 15:10 | PC1 | Email TRANSMISSION | USERA | ccc@xxx.com | ddd@xxx.com | - | ANNOUNCEMENT | ... |
| 11 | 2014/7/1 | 15:20 | PC2 | Email TRANSMISSION | USERB | eee@xxx.com | - | - | NOTIFICATION | ... |
| 12 | 2014/7/1 | 15:30 | MFP1 | SCAN AND TRANSMISSION | USERA | Email TRANSMISSION | ccc@xxx.com | 300dpi | DOUBLE-SIDED READING | ... |
| 13 | 2014/7/1 | 15:35 | PC2 | Email TRANSMISSION | USERB | eee@xxx.com | - | - | RE-NOTIFICATION | ... |
| 14 | 2014/7/1 | 15:36 | PC1 | Email TRANSMISSION | USERA | ggg@xxx.com | - | - | AUTHENTICATION REQUEST | ... |
| 15 | 2014/7/1 | 15:40 | MFP1 | COPY | USERA | NUMBER OF COPIES: 1 | DOUBLE-SIDED PRINTING: OFF | MAGNIFICATION: 100% | AUTOMATIC PAPER SELECTION | ... |
| 16 | 2014/7/1 | 15:45 | PC1 | Email TRANSMISSION | USERA | fff@xxx.com | - | - | SUBMISSION | ... |
| 17 | 2014/7/1 | 15:50 | PC1 | Email TRANSMISSION | USERA | ccc@xxx.com | ddd@xxx.com | - | CONTACT | ... |
| ... | ... | ... | ... | ... | ... | ... | ... | ... | ... | ... |

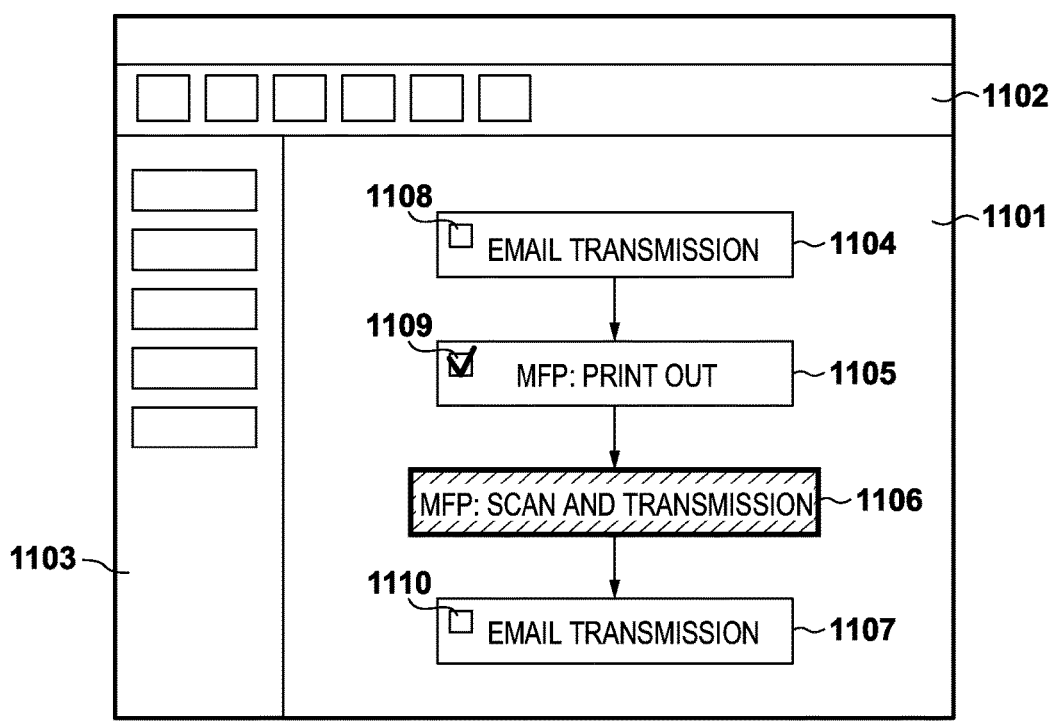
F I G. 11

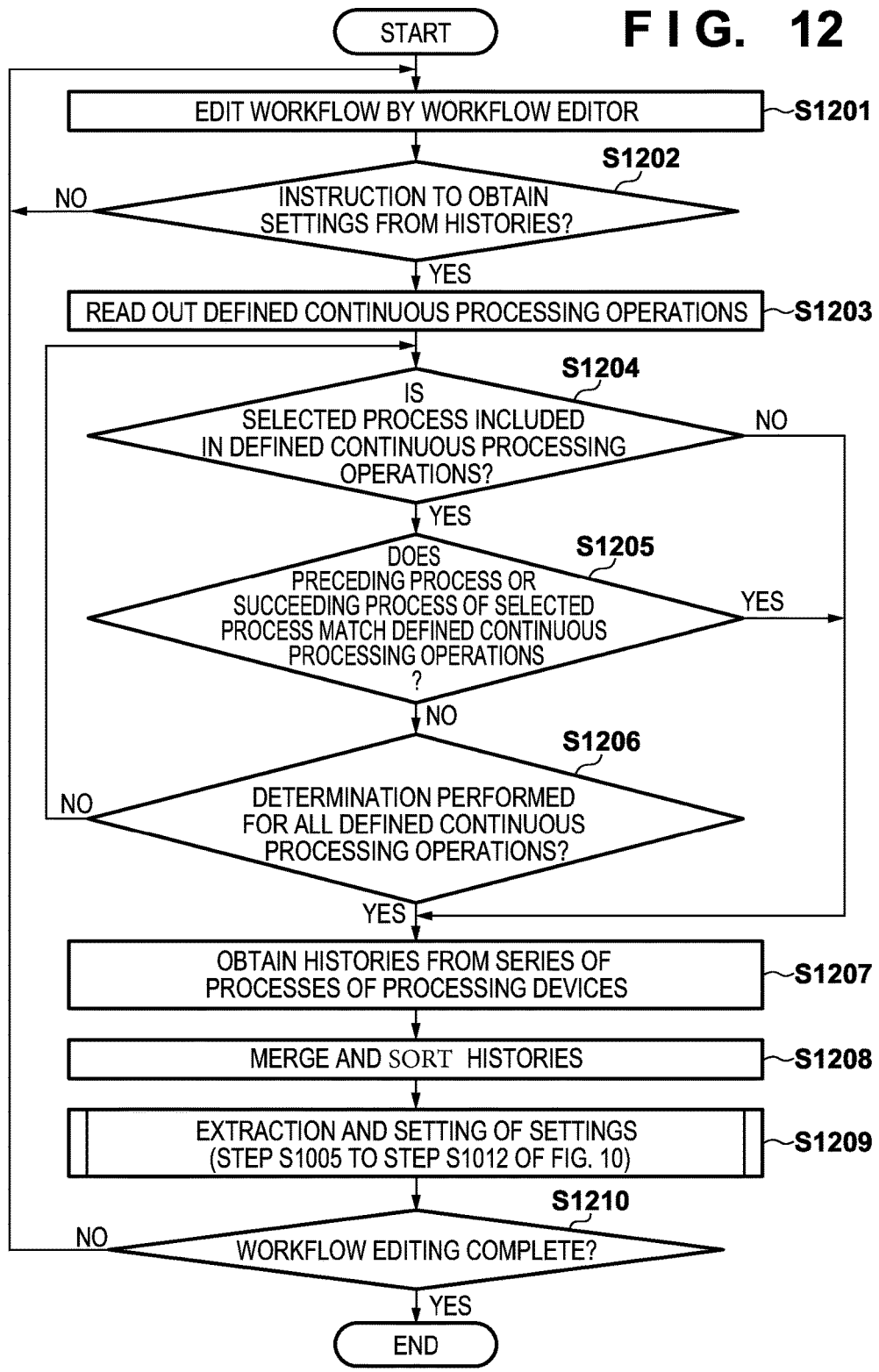

INFORMATION PROCESSING APPARATUS, METHOD OF CONTROLLING THE SAME, NON-TRANSITORY COMPUTER READABLE STORAGE MEDIUM, AND INFORMATION PROCESSING SYSTEM

BACKGROUND OF THE INVENTION

Field of the Invention

The present invention relates to an information processing apparatus, a method of controlling the same, a non-transitory computer readable storage medium, and an information processing system, and, more particularly, to settings for processing in editing a workflow that includes a processing request toward a device such as an image processing apparatus.

Description of the Related Art

Currently, automatic execution of a documentation workflow using a workflow engine is gaining attention as a way to improve efficiency of routine work operations in which documents are handled. The workflow engine operates on a server and executes tasks such as printing a document file held on a server, notifying emails to the operator, and the like in accordance with a predetermined workflow sequence. The workflow engine can also cause a device, such as a PC connected to a server via a network or the like, to execute processing such as printing of the document file, moving of the file, and editing of the file.

The workflow executed by the workflow engine is edited by using a tool called a workflow editor. The workflow editor outputs and stores an edited workflow as a workflow definition file. The workflow engine executes a workflow by loading the workflow definition file. Japanese Patent Laid-Open No. 2008-311941 discloses how, in workflow editing, processing to be executed as a workflow task is selected and set from the histories of a device that will perform document processing.

When a task that causes a device such as an MFP (Multi Function Peripheral) or the like to execute processing is included in the workflow editing by a workflow editor, settings of the processing need to be set. The MFP has a plurality of functions such as copy and scan and transmission. Even in the copy function alone, an extremely large number of setting items, for example, the number of copies, the setting for double-sided printing, the setting for print magnification, the setting for image scanning, the color setting at the time of printing, and the like exist for processing execution. Setting these settings in the way the user wants without making a mistake is extremely difficult.

Additionally, in creating a workflow, when a currently manually executed workflow is automated by a workflow engine, each apparatus may obtain a past processing history and set desired processing settings from the history. However, when there are a massive number of histories, finding the history of the desired processing from among the histories becomes difficult. Similarly, in Japanese Patent Laid-Open No. 2008-311941, finding the desired processing from the histories becomes difficult when the number of histories increases.

SUMMARY OF THE INVENTION

According to one aspect of the present invention, there is provided an information processing apparatus comprising: an editing unit configured to accept editing of a workflow formed by a plurality of jobs which are to be processed in one or a plurality of job processing apparatuses; an obtaining unit configured to obtain pieces of history information from the jobs processed by the one or the plurality of job processing apparatuses; an extraction unit configured to extract, from the pieces of history information obtained by the obtaining unit, a series of jobs having a job type arrangement in common with a job of interest out of the plurality of jobs forming the workflow that was edited by the editing unit and at least one of the jobs preceding or succeeding the job of interest; a display unit configured to display, out of the series of jobs that were extracted by the extraction unit, settings set in a job corresponding to the job of interest so the settings can be selected; and a setting unit configured to set a setting, selected by a user out of the settings displayed by the display unit, as the setting of the job of interest.

According to another aspect of the present invention, there is provided a control method for an information processing apparatus, comprising: an editing step of accepting editing of a workflow formed by a plurality of jobs which are to be processed in one or a plurality of job processing apparatuses; an obtaining step of obtaining pieces of history information from the jobs processed by the one or the plurality of job processing apparatuses; an extraction step of extracting, from the pieces of history information obtained in the obtaining step, a series of jobs having a job type arrangement in common with a job of interest out of the plurality of jobs forming the workflow that was edited in the editing step and at least one of the jobs preceding or succeeding the job of interest; a display step of displaying, out of the series of jobs that were extracted in the extraction step, settings set in a job corresponding to the job of interest so the settings can be selected; and a setting step of setting a setting, selected by a user out of the settings displayed in the display step, as the setting of the job of interest.

According to another aspect of the present invention, there is provided a non-transitory computer readable storage medium storing a program causing a computer to function as: an editing unit configured to accept editing of a workflow formed by a plurality of jobs which are to be processed in one or a plurality of job processing apparatuses; an obtaining unit configured to obtain pieces of history information from the jobs processed by the one or the plurality of job processing apparatuses; an extraction unit configured to extract, from the history information obtained by the obtaining unit, a series of jobs having a job type arrangement in common with a job of interest out of the plurality of jobs forming the workflow that was edited by the editing unit and at least one of the jobs preceding or succeeding the job of interest; a display unit configured to display, out of the series of jobs that were extracted by the extraction unit, settings set in a job corresponding to the job of interest so the settings can be selected; and a setting unit configured to set a setting, selected by a user out of the settings displayed by the display unit, as the setting of the job of interest.

According to another aspect of the present invention, there is provided an information processing system including one or a plurality of job processing apparatuses, comprising: an editing unit configured to accept editing of a workflow formed by a plurality of jobs which are to be processed in the one or the plurality of job processing apparatuses; an obtaining unit configured to obtain pieces of history information from the jobs processed by the one or the plurality of job processing apparatuses; an extraction unit configured to extract, from the history information obtained by the obtaining unit, a series of jobs having a job type arrangement in common with a job of interest out of the plurality of jobs forming the workflow that was edited by the editing unit and at least one of the jobs preceding or succeeding the job of interest; a display unit configured to display, out of the series of jobs that were extracted by the extraction unit, settings set in a job corresponding to the job of interest so that the settings are selectable; and a setting unit configured to set a setting, selected by a user out of the settings displayed by the display unit, as the setting of the job of interest.

The present invention allows, in setting of settings for processing of a device that has many setting items, quick and easy setting of desired processing settings in a workflow.

Further features of the present invention will become apparent from the following description of exemplary embodiments (with reference to the attached drawings).

BRIEF DESCRIPTION OF THE DRAWINGS

FIG. 5 is a table showing an example of history data of the MFP according to the first embodiment;

FIG. 8 is a view showing an example of a screen of a workflow editor according to the second embodiment;

FIG. 9 is a table showing an example of merged history data according to the second embodiment;

FIG. 11 is a view showing an example of a screen of a workflow editor according to the third embodiment; and FIG. 12 is a flowchart showing processing of the workflow editor according to the third embodiment.

DESCRIPTION OF THE EMBODIMENTS

Embodiments of the present invention will be described below with reference to the accompanying drawings. Note that the following embodiments do not limit the present invention according to the scope of the appended claims, and all combinations of characteristic features described in the embodiments are not always essential to solving means of the invention.

First Embodiment

[Hardware Arrangement]

Figure 1:
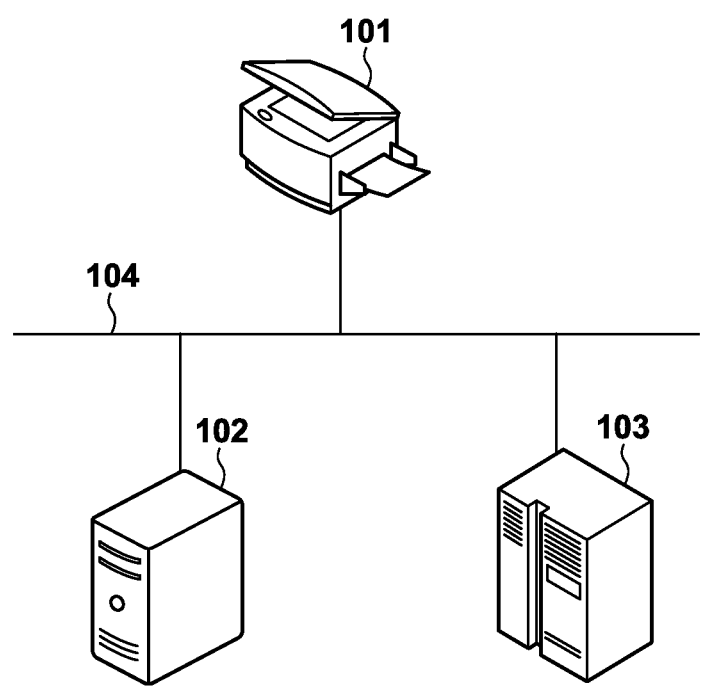
FIG. 1 is a view showing an example of a system arrangement according to the first embodiment.

FIG. 1 is a view showing an example of the overall arrangement of a system to which the embodiment of the present invention is applicable. In the system, an MFP 101 as an image processing apparatus and information processing apparatuses such as a PC 102 and a server 103 are connected via a network arranged by a LAN 104. In the system, the image processing apparatus (MFP) and the information processing apparatus (PC) each operate as a job processing apparatus capable of processing a job (task) designated by a workflow.

The MFP 101 includes a copy function for scanning a recording medium such as paper and printing an image formed based on the scanned data onto paper and a function such as scan and transmission for transmitting scanned data as digital data to the PC 102 and the server 103 via the network. The MFP 101 also includes a function that prints out transmitted image data, makes copies, or performs scan and transmission in response to a request from an external apparatus such as the server 103 connected via the network. Settings for print, copy, and scan and transmission are designated by the server 103 as the processing execution request source at the time of the execution request. Note that although the example of the MFP is raised as one example of the image processing apparatus, the present invention is not limited to this.

The server 103 includes a workflow engine function to sequentially execute processes according to a predesignated processing order. The workflow engine automatically executes processes such as file operation in the server 103 or PC 102, email transmission, and execution request to the MFP 101 in accordance with a workflow defined by a predesignated processing order. Note that in the following explanation, the plurality of processes forming the workflow is used synonymously with jobs executed in the apparatuses. The workflow executed by the workflow engine is defined by the user by using an editing tool called a workflow editor in a server 103 or the like. The user selects processes executable by the workflow engine via the workflow editor, designates an execution order, and further sets the settings of the processes to be executed. The workflow created by the workflow editor is output as a workflow definition file, and the workflow becomes executable by loading this file to the workflow engine. The workflow editor provided by the server 103 can be displayed on a web browser of the PC 102 in response to a request from the PC 102 or the like.

Figure 2:
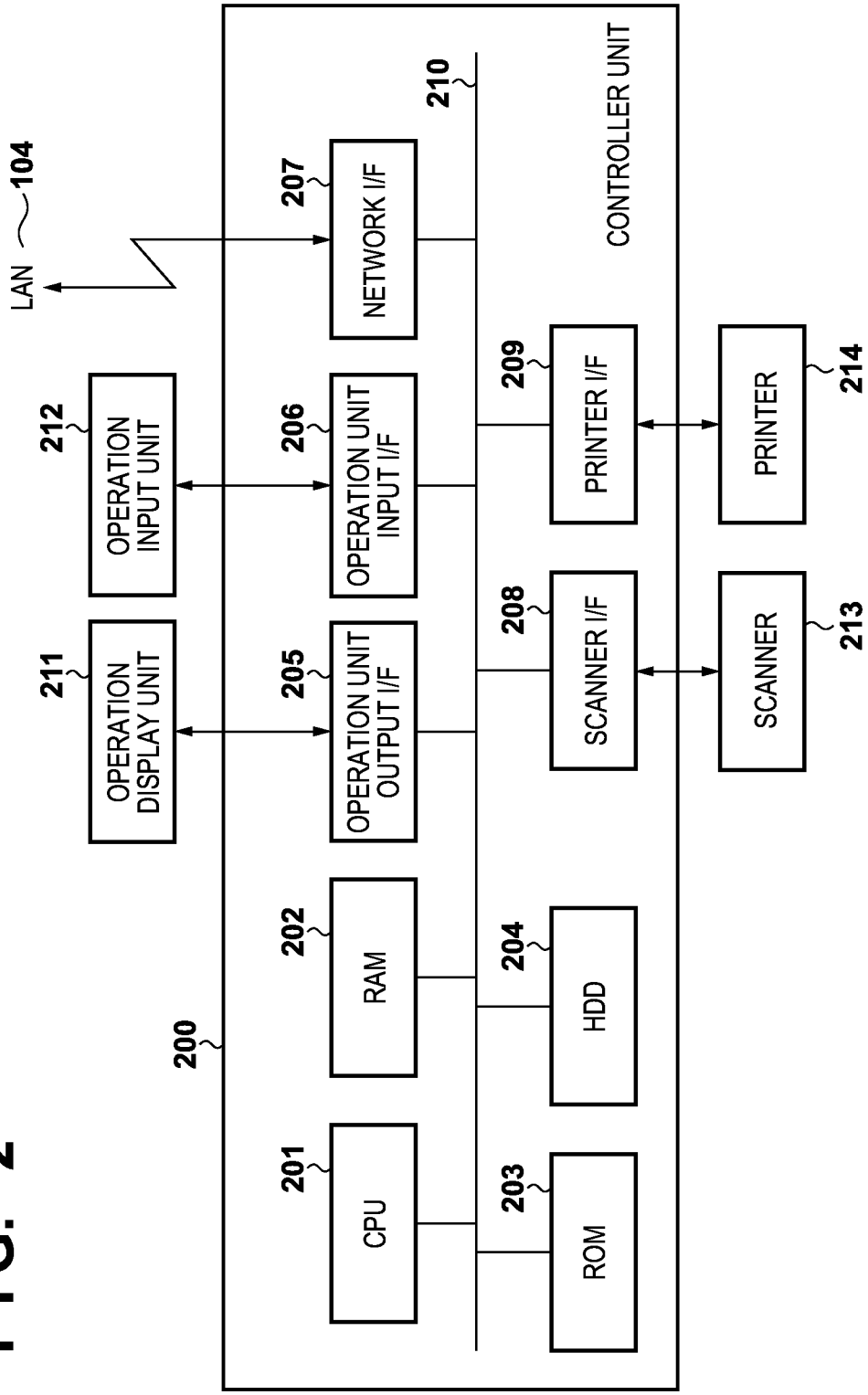
FIG. 2 is a block diagram showing an example of a hardware arrangement of an MFP according to the first embodiment.

FIG. 2 is a block diagram showing an example of the hardware arrangement of the MFP 101. The MFP 101 includes a controller unit 200 that can connect a scanner 213 and a printer 214 as well as connect an operation display unit 211, an operation input unit 212 and the LAN 104. The controller unit 200 includes a CPU 201 that executes various types of control programs. The CPU 201 activates the MFP 101 based on a boot program stored in a ROM 203. The CPU 201 also reads out a control program stored in an HDD 204 and executes and controls predetermined processing using a RAM 202 as the work area.

The HDD 204 is a non-volatile storage unit and stores various types of control programs that include functions such as copy and scan and transmission. Histories of processes executed by the various types of control programs are stored in the HDD 204. The time when the process was executed, the user who executed the process, and the various types of settings at the time when the process was executed are recorded in each history. Further, the execution histories of the processes stored in the HDD 204 are transmitted via a network I/F 207 in accordance with a request from a device outside the apparatus.

An operation unit output I/F 205 controls communication of data output to the operation display unit 211. An operation unit input I/F 206 controls communication of data input from the operation input unit 212. The network I/F 207 is connected to the LAN 104 and controls input and output of information via the LAN 104. A scanner I/F 208 inputs image data from the scanner 213 as well as performs input and output of scanner control data. A printer I/F 209 outputs output image data to the printer 214 as well as performs input and output of printer control data. The aforementioned devices are arranged on a system bus 210.

The operation input unit 212 is an interface that includes an input device such as a touch panel or hard keys for inputting an instruction from a user. The operation display unit 211 is an interface that includes a display device such as an LCD or an LED for displaying information to the user. The scanner 213 includes an optical reading device such as a CCD and has a function of optically scanning a paper medium and reading the medium as digital image data. The printer 214 has a function of forming digital image data as an image on a recording medium such as paper.

The MFP 101 also can accept a processing execution request from an external device via the network I/F 207. The processing execution request is requested together with the type of execution processing and setting information at the time of execution from the external device and executed by the CPU 201 after being temporarily stored in the HDD 204 or the RAM 202.

Figure 3:
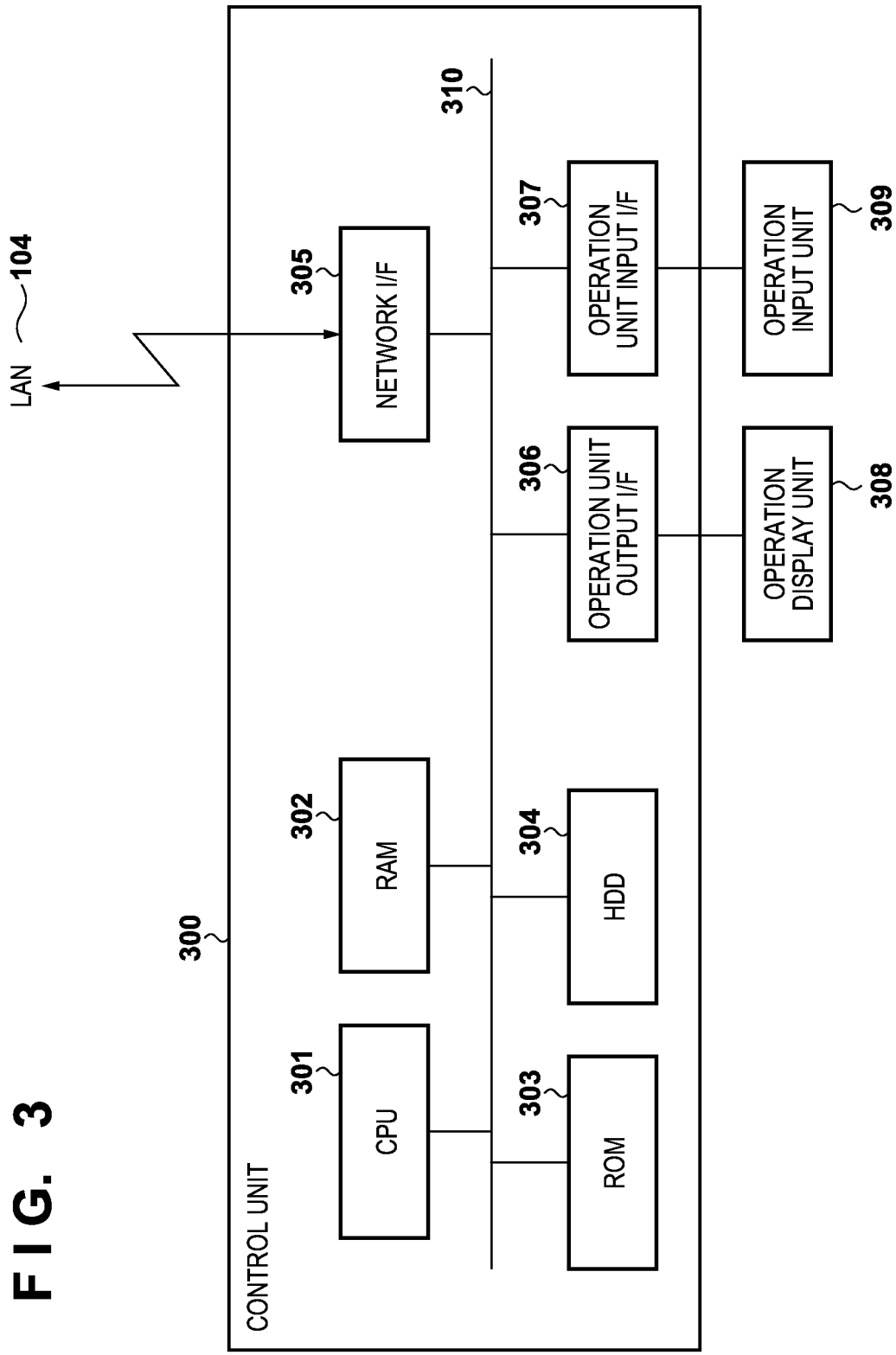
FIG. 3 is a block diagram showing an example of a hardware arrangement of a server and a PC according to the first embodiment.

FIG. 3 is a block diagram showing an example of the hardware arrangement of the server 103. Note that the PC 102 is also provided with the same arrangement as the server 103, and a detailed description of the arrangement of the PC 102 will be omitted. The server 103 includes a control unit 300 connectable to the LAN 104. The control unit 300 includes a CPU 301 that executes various types of programs and controls the overall operation of the server 103 and the PC 102. The CPU 301 reads out a control program stored in a ROM 303 or a HDD 304 and executes predetermined processing using a RAM 302 as the work area.

The HDD 304 is a non-volatile storage unit and stores various types of control programs that include the functions of the workflow engine and the workflow editor. The HDD 304 also stores the histories of processes executed by the various types of programs. The time when the process was executed, the user who executed the process, and the various types of settings at the time when the process was executed are recorded in each history. Further, the execution histories of the processes stored in the HDD 304 are transmitted via a network I/F 305 in accordance with a request from a device outside the apparatus.

The network I/F 305 controls the input and output of information via the LAN 104. An operation unit output I/F 306 controls communication of data output to an operation display unit 308. An operation unit input I/F 307 controls communication of data input from an operation input unit 309. The aforementioned devices are arranged on a system bus 310.

The operation display unit 308 is an interface that includes a display device such as an LCD or an LED for displaying information to the user. The operation input unit 309 is an interface that includes an input device such as a keyboard or a mouse for inputting an instruction from a user.

The PC 102 and the server 103 also can accept a processing execution request from an external device via the network I/F 305. The processing execution request is requested together with the type of execution processing and setting information at the time of execution from the external device and is executed by the CPU 301 after being temporarily stored in the HDD 304 or the RAM 302.

Figure 4:
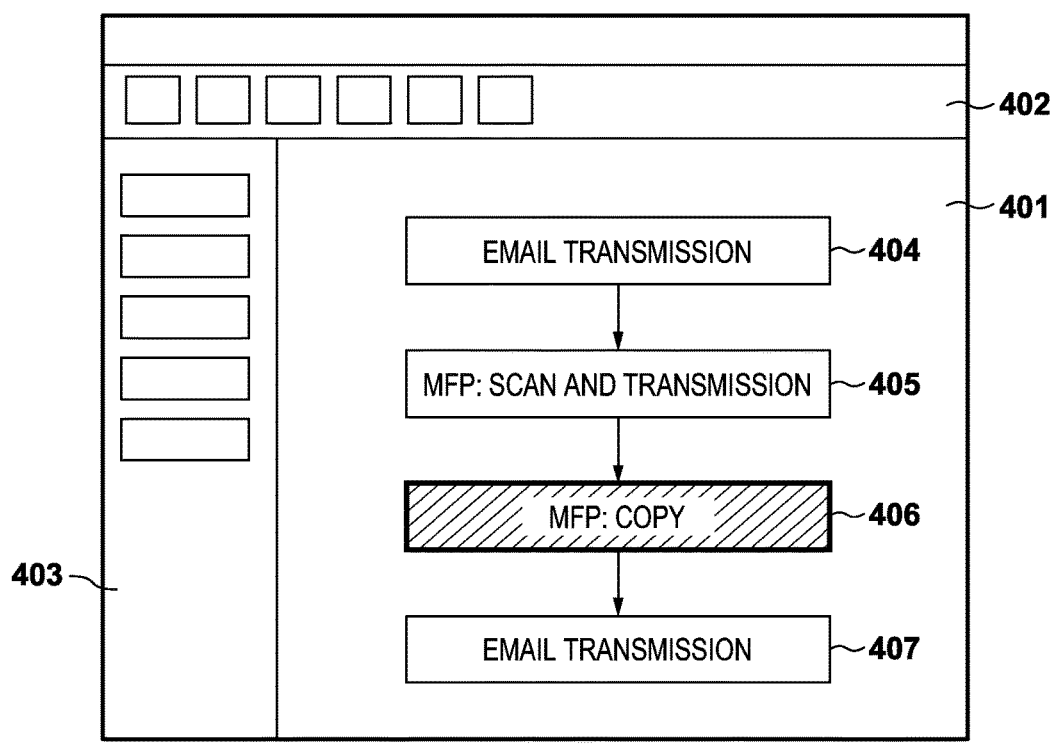
FIG. 4 is a view showing an example of a screen of a workflow editor according to the first embodiment.

FIG. 4 is a view showing an example of the operation screen of the workflow editor which is displayed on the operation display unit 308 of the server 103. A workflow editing portion 401 displays a currently edited workflow. Processes 404 to 407 defined as the respective processes of the workflow are displayed as graphics, and arrows which respectively connect between the graphics indicate the execution order of the workflow. The arrangements and types of these graphics and the connection order of the arrows are changed to edit the processes and the order executed by the workflow. FIG. 4 shows that the processes 404, 405, 406, and 407 are to be executed in order in the workflow.

An editor menu portion 402 is arranged with a menu or instruction buttons to perform an operation regarding the workflow such as saving an edited workflow, loading a stored workflow, and obtaining the settings of each process from the histories. The processes of the workflow edited by the workflow editing portion 401 are arranged as buttons in a workflow selection portion 403. The types of processes to be arranged in the workflow selection portion 403 are not particularly limited, but for example, functions provided in the MFP 101 included in the system may be used. After selecting the desired processing objects to execute in the workflow, the workflow can be edited by arranging the selected objects in the workflow editing portion 401 by drag and drop using a mouse.

In the example shown in FIG. 4, the process 406 can be selected in the workflow editing portion 401. The process 406 is a process to execute the copy function in the MFP. The copy function settings in the process 406 for executing this copy function are set in the workflow editing portion 401. Upon selecting the process 406, an operation for obtaining the settings from the histories is selected from the editor menu portion 402. The workflow editor then obtains the execution histories of the function from the MFP designated for executing the process.

An example of some of the execution histories obtained from the MFP is shown in FIG. 5. For descriptive convenience, the contents of the histories are shown in a table format. "No." 501 indicates the number of each history when the histories are arranged in the processing order. "Date" 502 and "Time" 503 indicate the date and time, respectively, when each process was executed in the MFP. "Processing Type" 504 indicates the type of each process executed by the MFP. The processing type indicated here is the type (job type) of a function such as the copy function or scan and transmission. "Executor" 505 indicates the user name of a user who instructed the execution of each process. If users are managed by the MFP, a user needs to log in to the device through user authentication before the execution of the process. The user name that is identified by the authentication processing is recorded.

Each of "Setting" 506 to "Setting" 509 indicates setting information when the processing indicated in "Processing Type" 504 is executed. Although information of an amount that can allow the same processes to be executed again is recorded in practice, such descriptions will be omitted. Note that the setting arrangement and assignment in the execution histories are defined in advance for each processing type. The workflow editor searches, from the obtained execution histories, for history information that matches the currently selected process to set the settings. At this time, the processing order of the workflow being edited by the workflow editor is taken into consideration to search for the execution histories.

In the workflow editing portion 401 in FIG. 4, the copy process of the MFP is selected as the process to set settings. Also in the workflow editing portion 401, whether a preceding or succeeding process of the same MFP exists for this selected process is checked. In FIG. 4, the scan and transmission process 405 by the same MFP is to be performed prior to the copy process in the workflow. In other words, the portion in which the scan and transmission process has been executed is searched from the histories prior to the portion of the copy process to set the settings.

When the workflow is edited by the workflow editor and is automatically executed by the workflow engine or the like, automating a workflow that is currently executed in order by manual labor is more common than creating a new workflow from scratch. That is, since a workflow to be edited by the workflow editor tends to be processes that are being currently executed, using the settings recorded in the execution histories as the settings for these processes are more efficient as an editing operation. However, searching for a portion that matches each process of the workflow that is being edited out of the massive amount of execution histories is extremely difficult. Therefore, a portion where processes are executed in the same order as the currently edited workflow is searched so that settings for the same processes can be used.

The workflow editor searches for a portion where "scan and transmission" and "copy" are processed in this order out of the execution histories shown in FIG. 5. When a search is conducted based on the information of "Processing Type" 504, five history groups 510 to 514 match in FIG. 5. Since the currently edited workflow is a workflow executed in order by a single user, the history group 512 which has two continuous processes executed by different users is excluded based on the information of "Executor" 505. Further, based on the information of "Date" 502 and "Time" 503, the history group 514 in which the time interval between two continuous processes is equal to or more than a predetermined time is not regarded as processes in the same workflow and is excluded. In FIG. 5, therefore the three history groups 510, 511, and 513 are detected as portions corresponding to the workflow of the processes 405 and 406 shown in FIG. 4. Note that the threshold of the predetermined time for determining the above-described time interval is defined in advance.

Figure 6:
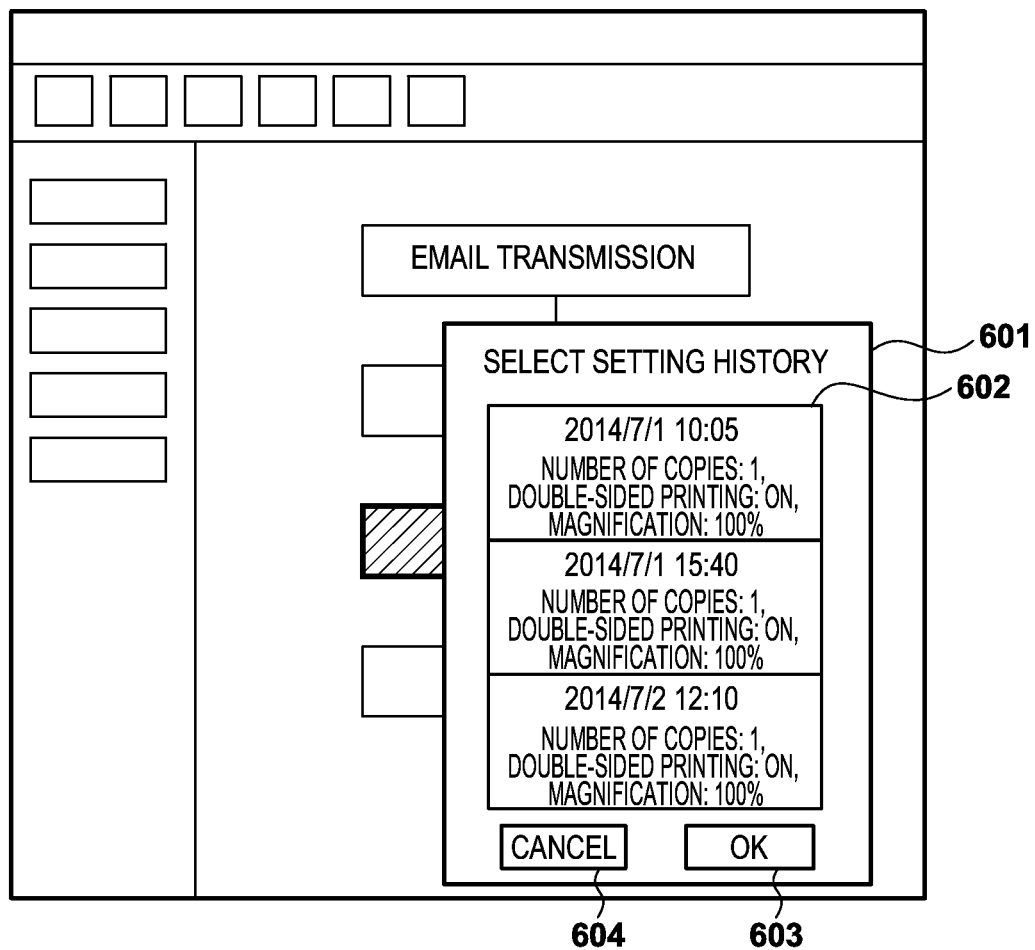
FIG. 6 is a view showing an example of the screen of the workflow editor according to the first embodiment.

FIG. 6 shows the operation screen displayed after an operation is performed to obtain the settings from the histories via the editor menu portion 402, the histories are obtained based on the operation, and a search is conducted in FIG. 4. A setting selection dialogue 601 is displayed for selecting the settings extracted from the corresponding portions of the plurality of found histories.

A history list 602 is a list that displays the plurality of corresponding portions detected from the execution histories so they can be selected. The history list 602 displays a part of the information of each corresponding portion to allow the user to make a selection. The settings of the pieces of history information corresponding to the three history groups 510, 511, and 513 in the execution histories of FIG. 5 are displayed in the history list 602. When the user selects any of the portions on the history list 602 and selects an OK button 603, the setting contents of the process selected on the history list 602 are set as the settings of the process 406 selected in the workflow editing portion 401 in FIG. 4. If settings corresponding to the history group 510 in FIG. 5 are selected, settings corresponding the copy process (history whose value in "No." 501 is "3") are set as the settings of the copy function in the process 406.

[Processing Sequence]

Figure 7A:
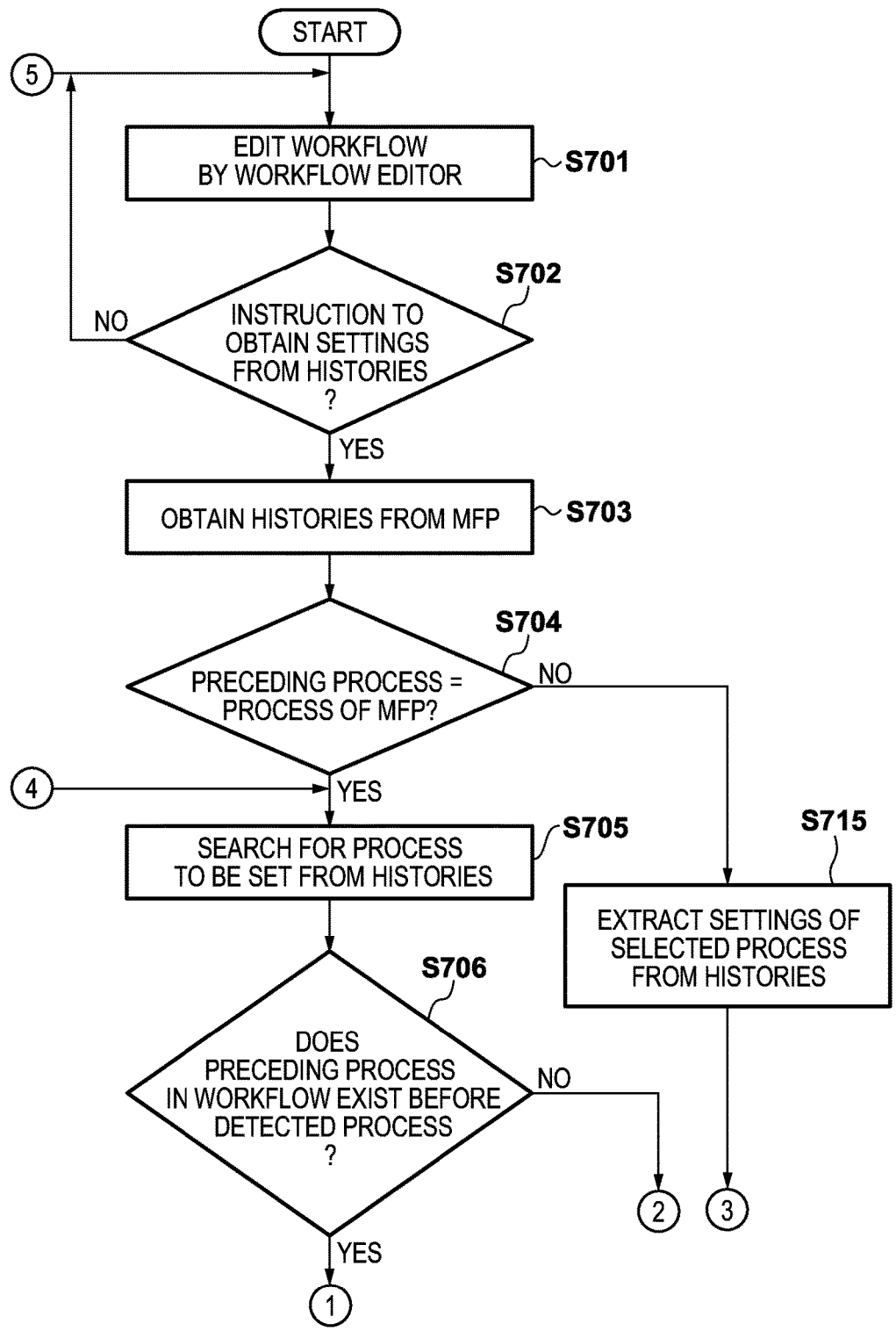
FIGS. 7A and 7B are flowcharts showing processing of the workflow editor according to the first embodiment.
Figure 7B:
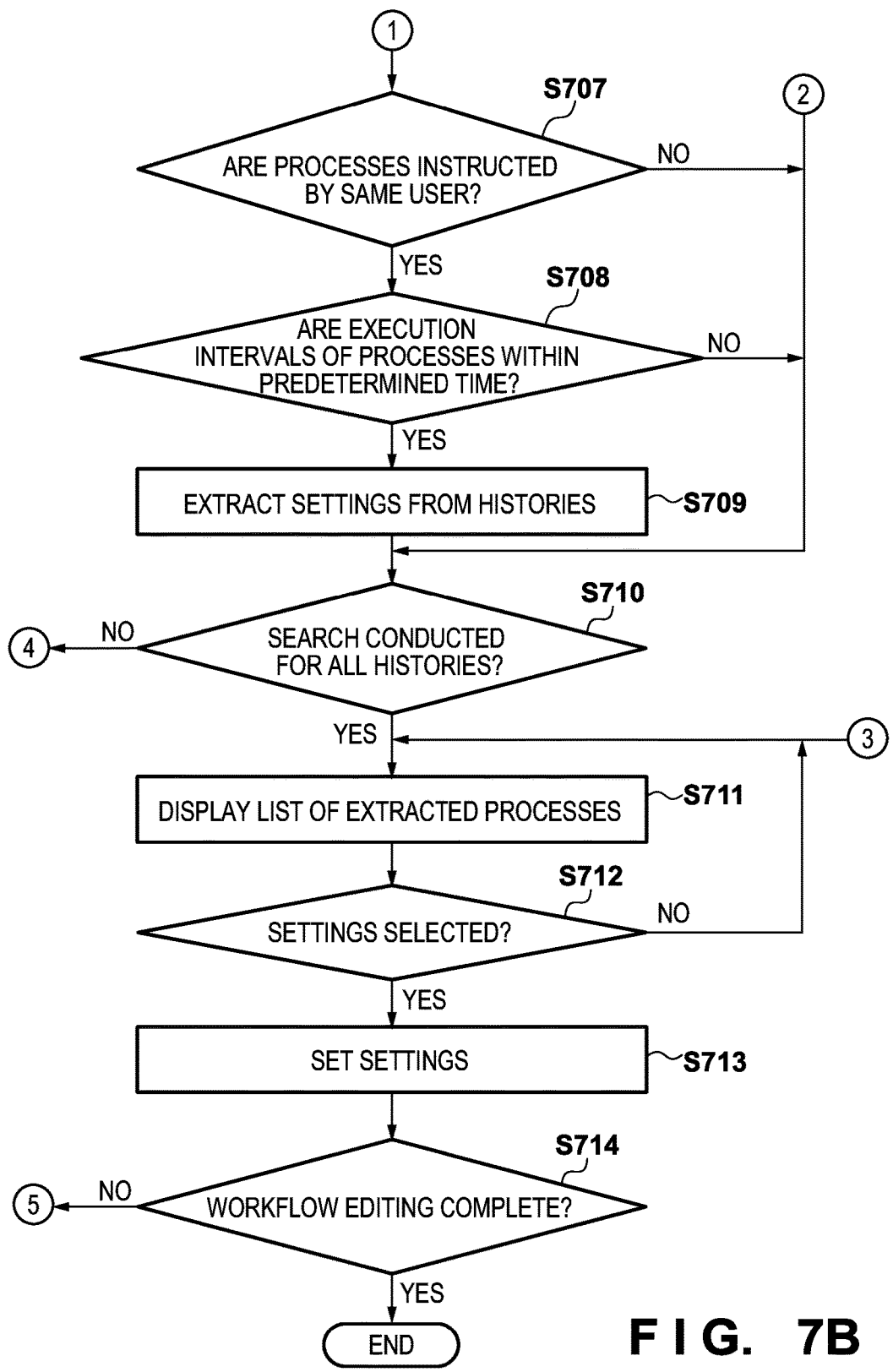

FIGS. 7A and 7B are flowcharts showing the sequence of the series of processes according to the first embodiment. Each step in the flowcharts of FIGS. 7A and 7B is processed by the CPU 201 executing a workflow editor execution program stored in the HDD 204 of the server 103.

In step S701, the workflow editor accepts an instruction to edit the workflow. In practice, processing objects are dragged and dropped from the workflow selection portion 403 to the workflow editing portion 401 on the editing screen shown in FIG. 4, and the processing to edit the order of these objects is accepted.

In step S702, the workflow editor determines, in regard to the editing of the workflow, whether it has received an instruction to obtain the settings of a process of the MFP 101 from the histories. More specifically, the workflow editor determines, in a state where the process of the MFP is selected in the workflow editing portion 401, whether an operation to obtain the settings from the histories has been instructed in the editor menu portion 402. If the workflow editor determines that no obtaining operation has been instructed (NO in step S702), the process returns to step S701. If the workflow editor determines that the obtaining operation has been instructed (YES in step S702), the workflow editor obtains the histories from the MFP in step S703.

In step S704, the workflow editor determines whether the process preceding the process selected in the workflow editing portion 401 is a process of the MFP. If the preceding process is determined as the process of the same MFP, the workflow editor regards these two continuous processes as search targets. Although the determination is made by targeting the process preceding the process of interest (selected process) in the flowcharts of FIGS. 7A and 7B, the present invention is not limited to this. The determination can be made by targeting the succeeding process. Also both the preceding and succeeding processes can be used as determination targets. In such a case, if both the preceding and succeeding processes are processes of the MFP, either of the two may be regarded as one of the two continuous processes. If the process is determined to be process of the same MFP (YES in step S704), the process advances to step S705. Otherwise (NO in step S704), the process advances to step S715.

In step S705, the workflow editor searches, from the histories obtained in step S703, for a portion in which a process that matches the workflow process to set the settings (that is, the process selected in the workflow editing portion 401 in FIG. 4) is executed.

In step S706, the workflow editor determines, regarding the process found from the histories, whether the preceding executed process of the found process is the same processing type as the process preceding the process currently selected in the workflow editing portion 401. If the workflow editor determines that the process preceding the process found from the histories is not the same processing type as the process preceding the selected process (NO in step S706), the process advances to step S710.

If the workflow editor determines that the preceding executed process of the detected process from the histories is the same processing type as the process preceding the selected process (YES in step S706), the workflow editor determines, in step S707, whether the two continuous processes in the histories are processes that have been instructed by the same user. If the workflow editor determines that the processes were not implemented by the same user (NO in step S707), the process advances to step S710.

If the workflow editor determines that the processes were implemented by the same user (YES in step S707), the workflow editor determines whether the interval between the execution times of the two continuous processes in the histories is within a predetermined time in step S708. This predetermined time may be a predetermined value or be designated by the user. If the interval is determined not to be within the predetermined time (NO in step S708), the process advances to step S710.

If the interval is determined to be within the predetermined time (YES in step S708), the workflow editor regards the two continuous processes as matching those in the histories and extracts, in step S709, the settings of the corresponding process. The workflow editor then stores the extracted pieces of information in a storage location such as the HDD 204 or the RAM 202.

In step S710, the workflow editor determines whether processes from step S705 to step S709 have been implemented for all the obtained histories. If the workflow editor determines that search processing for all the histories has not been completed (NO in step S710), the process returns to step S705. If the workflow editor determines that the search processing has been implemented for all the obtained histories (YES in step S710), the workflow editor displays, in step S711, the settings extracted in step S709 in a list like the setting selection dialogue 601 of FIG. 6.

On the other hand, if the workflow editor determines that the process preceding the process selected in the workflow editing portion 401 is not the process of the MFP (NO in step S704), the workflow editor extracts, in step S715, settings of the same processing type as the selected process from the histories. A list is similarly displayed in step S711 even when the settings are extracted in step S715. Subsequently, the process advances to step S711.

In step S712, after the setting selection dialogue 601 is displayed, the workflow editor determines whether settings have been selected. More specifically, the workflow editor determines whether the OK button 603 has been selected in a state where any one of the settings on the history list 602 is selected. If the workflow editor determines that no settings have been selected (NO in step S712), the process returns to step S711.

If the workflow editor determines that the settings have been selected (YES in step S712), the workflow editor sets, in step S713, the selected settings as the settings of the current setting target process.

In step S714, the workflow editor determines whether editing of the workflow has been completed. More specifically, the workflow editor determines whether an operation to end workflow editing has been instructed via the editor menu portion 402. If the workflow editor determines that no instruction to end workflow editing has been given (NO in step S714), the process returns to step S701. Otherwise (YES in step S714), the workflow editor ends the workflow editing processing.

From the embodiment described above, in the editing operation of the settings of an MFP process in workflow editing, the settings can be easily set by using the settings from the past histories of processes actually executed by the MFP. Further, the processing order in which the processes were actually executed and the user that executed the process are considered and extracted while histories of processes having a too long processing execution interval are excluded. Therefore, the history of the process of interest out of the massive amount of histories can be easily found, and operability during workflow editing can be improved.

In this manner, the settings of a desired process in a workflow can be quickly and easily set when setting the settings for the processing of a device having a many setting items.

Second Embodiment

In the second embodiment, in the currently edited workflow, when searching for a portion corresponding to the process to set settings from the histories obtained from an external apparatus, histories obtained not only from an MFP but also from an apparatus such as a PC are searched. Also, at that time, instead of regarding one process that either precedes or succeeds the process to set the settings as a continuous processing target, three or more continuous processes are regarded as search targets. In addition, the user can freely select, from the currently edited workflow, these continuous processes that are regarded as search targets. Only differences from the first embodiment will be described in the second embodiment.

The system arrangement and the hardware arrangement are the same as those described in the first embodiment, and descriptions thereof will be omitted. FIG. 8 shows an example of an operation screen of a workflow editor which is displayed on an operation display unit 308 of a server 103 according to the second embodiment. The arrangement of a workflow editing portion 801 to a workflow selection portion 803 in FIG. 8 are the same as the arrangement of the workflow editing portion 401 to the workflow selection portion 403 in FIG. 4. Processes 804 to 807 are defined as a series of continuous processes in the same manner as in FIG. 4.

In FIG. 8, as the process to set the settings, a process 806 corresponding to the copy process in an MFP is selected. Additionally, a process 805 preceding the process 806 is not an execution processing in the MFP but is an email transmission process in a PC.

In a state where the copy process 806 is selected, an operation to obtain settings from the histories is selected via the editor menu portion 802. From this selection, on a part of each display for the processes 804, 805, and 807 which are processes other than the selected process 806, checkboxes 808 to 810 are displayed for selecting processes that are to be regarded as a series of continuous processing operations for the selection target process. The checkbox allows a user to select which processes, as the series of processes, are to be included in the search targets when searching for selection target processes in the histories. By selecting checkboxes, the user can designate which processes are to be regarded as the series of processes of the currently selected process and searched for in the histories.

Assume that the process 805 which precedes the process 806 and the process 807 which succeeds the process 806 are selected as shown in FIG. 8. The number of selected processes may be two like in the example or it may be three or more. Each process must be a process that is continuous with the current setting target process. Therefore, if the checkbox of the process 804 is selected when the target to set the settings is the process 806, the checkbox of the process 805 is automatically selected and also regarded as the target.

As the process 806 (copy process) of the MFP is selected as the process to set the settings and the processes 805 and 807 are further selected as the series of processes to be searched in the histories, three processes are selected as a result. In this state, an operation to obtain settings from the histories is designated via the editor menu portion 802. Since the process 806 is the copy process of the MFP and the processes 805 and 807 are email transmission processes in the series of processes, the workflow editor obtains histories of the processes from the MFP and the PC. Furthermore, the workflow processing merges the obtained plurality of histories and sorts the histories in chronological order.

A part of an example of the merged and sorted execution histories is shown in FIG. 9. For descriptive convenience, the contents of the histories are shown in a table format. In FIG. 9, "No." 901, "Date" 902, and "Time" 903 are the same as 501 to 503, respectively, in FIG. 5. "Processing Type" 905, "Executor" 906, and "Setting" 907 to "Setting" 910 are the same as "Processing Type" 504, "Executor" 505, and "Setting" 506 to "Setting" 509, respectively, in FIG. 5.

"Device" 904 shows information indicating whether the device which executed the process is an MFP or a PC. When the histories are obtained from a plurality of MFPs and PCs, pieces of information to identify the devices are also included. Although information of an amount which can allow the same processes to be executed again is recorded in these pieces of execution processing history information, descriptions of sections thereof that are the same as those in the first embodiment will be omitted.

The workflow editor searches for portions that have executed the currently selected series of processes from the obtained execution processing histories. The series of processes 805 to 807 selected in the workflow editing portion 801 are an email transmission process of the PC, a copy process of the MFP, and an email transmission process of the PC, respectively. From this, two history groups 911 and 912 are found as corresponding portions in the histories. At this time, whether the series of processes have been executed by the same user and/or whether the time interval between the series of processes is equal to or longer than a predetermined period may be checked.

The processes of the MFP to set the settings are extracted from the series of processes by the search. In this case, processes of the MFP corresponding to the histories whose values are "6" and "15", respectively, in "Number" 901 in FIG. 9 are extracted. In the same manner as in FIG. 6 of the first embodiment, the workflow editor displays a setting selection dialogue 601 to make the user select which settings to set. The subsequent processes are the same as those in the first embodiment.

[Processing Sequence]

Figure 10:
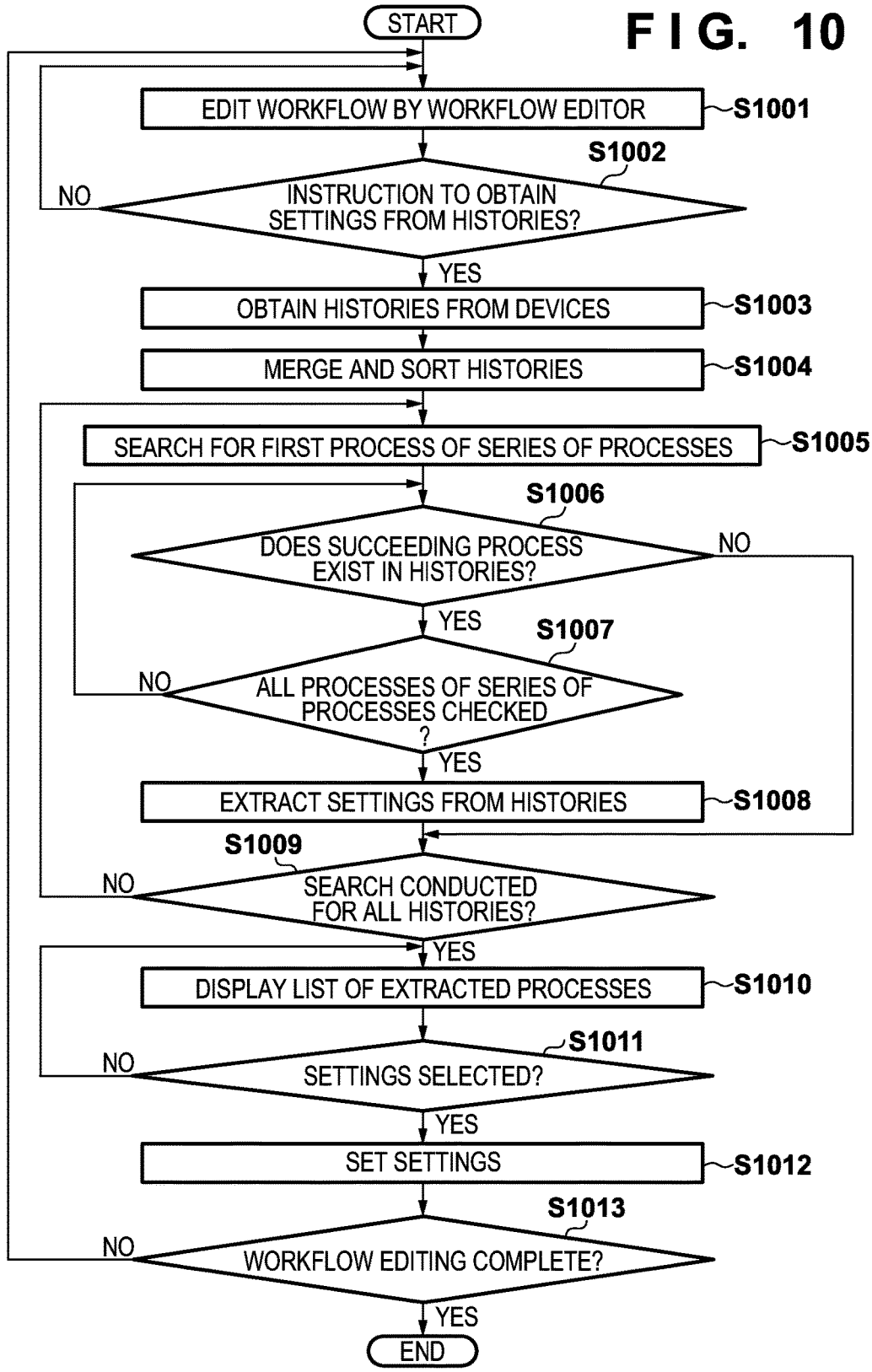
FIG. 10 is a flowchart showing processing of the workflow editor according to the second embodiment.

FIG. 10 is a flowchart showing the sequence of the series of processes according to the second embodiment. Each step in the flowchart of FIG. 10 is processed by the CPU 201 executing a workflow editor execution program stored in the HDD 204 of the server 103.

In step S1001, the workflow editor accepts an instruction to edit the workflow. In the same manner as the first embodiment, the workflow editor accepts the processing to edit the order of processing objects when the user drags and drops the processing objects from the workflow selection portion 803 to the workflow editing portion 801 on the editing screen shown in FIG. 8. Further, if any one of the processes is selected, the workflow editor displays the checkboxes 808 to 810 for all the other processes to make the user select the processes to be regarded as the search targets as a series of processes together with the selected process.

In step S1002, the workflow editor determines, in the editing of the workflow, whether it has received an instruction to obtain the settings of the processes from the histories. This process is the same as that in step S702 of FIG. 7A in the first embodiment. If the workflow editor determines that no obtaining operation has been instructed (NO in step S1002), the process returns to step S1001. If the workflow editor determines that the obtaining operation has been instructed (YES in step S1002), the workflow editor obtains, in step S1003, the execution histories from the execution devices of the processes selected in the workflow editing portion 801 as the series of processes. In this case, the MFP and the PC correspond to the execution devices.

In step S1004, the workflow editor merges the histories obtained from the plurality of devices and sorts the obtained histories in chronological order. In step S1005, the workflow editor searches, from the histories that have been merged and sorted in step S1004, for the first process out of the processes selected as the series of processes.

In step S1006, the workflow editor determines whether the succeeding process out of the processes selected as the series of processes exists as the succeeding process of the process that was searched for in the histories. If the workflow editor determines that no process exists as the succeeding process or that no first process of the series of processes exists (NO in step S1006), the process advances to step S1009.

If the workflow editor determines that the succeeding process out of the processes selected as the series of processes exists as the succeeding process of the process detected from the histories (YES in step S1006), the workflow editor determines whether matching determination with the histories has been executed for all the processes of the series of processes in step S1007. If the determination has not been executed for all the processes of the series of processes (NO in step S1007), the process returns to step S1006.

If the determination to check whether the matching determination with the histories has been executed for all the processes of the series of processes (YES in step S1007), the workflow editor extracts, from the histories, settings of portions corresponding to the selection target processes in step S1008. In the same manner as in the first embodiment, the extracted settings are stored in a storage location such as the HDD 204 or the RAM 202. Subsequently, the process advances to step S1009.

In step S1009, the workflow editor determines whether all the histories have been searched. If the workflow editor determines that not all of the histories have been searched (NO in step S1009), the process returns to step S1005. Otherwise (YES in step S1009), the workflow editor displays a list of the extracted settings in step S1010. This process is the same as that in step S711 in the first embodiment. Since the succeeding processes from step S1011 to step S1013 are the same as the processes from step S712 to step S714 of FIG. 7B in the first embodiment, descriptions thereof will be omitted.

From the second embodiment described above, settings can be set by obtaining history information from a device that is to execute the process even when the process to set the settings is not the process executed in the MFP. Furthermore, even when extracting a corresponding portion from the histories while taking into account the processing order in the workflow, two or more processes can be considered and the user can select the processes to be the search targets. Therefore, if the search result becomes massive even when the processing order has been taken into account, a more flexible search condition can be designated, and the corresponding settings can be easily searched from the histories.

Third Embodiment

In the third embodiment, in the currently edited workflow, when process to set settings is selected, obtaining operation and search operation of histories are conducted by regarding the preceding and succeeding processes that are assumed to have high relevance to the process as the series of processes. Only differences from the first and the second embodiments will be described in the third embodiment.

FIG. 11 shows an example of an operation screen of a workflow editor which is displayed on an operation display unit 308 of a server 103 according to the third embodiment. The arrangement of a workflow editing portion 1101 to a workflow selection portion 1103 in FIG. 11 is the same as the arrangement of the workflow editing portion 401 to the workflow selection portion 403 in FIG. 4. Processes 1104 to 1107 are defined as a series of continuous processes in the same manner as in FIG. 4.

In FIG. 11, as the process to set the settings, scan and transmission process 1106 of an MFP is selected. Assume that the user selects an operation to obtain the settings from the histories via the editor menu portion 1102. The workflow editor then determines whether a process that has high relevance to the currently selected process exits before or after the selected process. In this case, assume that print out process of the MFP exists before the scan and transmission process of the MFP. Since it is highly likely that a printed paper medium will be scanned and transmitted in a scan and transmission operation of a printed paper medium, the continuous processes from the print process of the MFP to the scan and transmission processing can be determined to have high relevance. Thus, the series of processes are regarded as search targets in the extraction of the settings from the histories. Other than these processes, file operation in the PC after the scan and transmission operation in the MFP are considered as a series of processes that can be determined as having high relevance. This is because it is highly likely that the scanned image file transmitted from the MFP will be edited and moved on the PC. As a matter of course, the series of processes may be other processes regarded to have high relevance. In addition, the series of processes may not only be two continuous processes, but three or more highly relevant processes.

For the processes determined to be a series of processes, a checkmark is displayed on a checkbox 1109 in FIG. 11 to indicate to the user that the process has become a target of the series of processes. The plurality of highly relevant processes (to be referred to as continuous processing operations hereinafter) determined to be the series of processes are held as predetermined pieces of information in an HDD 204 or the like. Alternatively, as a reference for determining whether these processes have high relevance, integration of continuous processes may be conducted based on the histories. An arrangement of processes occurring at a predetermined frequency or more or an arrangement of processes occurring within a predetermined time interval may be handled as a series of highly relevant processes. After the series of processes are selected, search processing is performed in the same manner as in the first and second embodiments to obtain the desired settings from the histories.

[Processing Sequence]

FIG. 12 is a flowchart showing the sequence of the series of processes according to the third embodiment. Each step in the flowchart of FIG. 12 is processed by the CPU 201 executing a workflow editor execution program stored in the HDD 204 of the server 103.

In step S1201, the workflow editor accepts an instruction to edit the workflow. In the same manner as the first embodiment, the workflow editor accepts the processing to edit the order of processing objects when the user drags and drops the processing objects from the workflow selection portion 1103 to the workflow editing portion 1101 on the editing screen shown in FIG. 11.

In step S1202, the workflow editor determines, in the editing of the workflow, whether it has received an instruction to obtain the settings of the process from the histories. This process is the same as that in step S702 of FIG. 7A in the first embodiment. If the workflow editor determines that no obtaining operation has been instructed (NO in step S1202), the process returns to step S1201. If the workflow editor determines that the obtaining operation has been instructed (YES in step S1202), the workflow editor reads out, in step S1203, a definition of the highly relevant continuous processing operations predefined and stored in the HDD 204 or the like.

In step S1204, the workflow editor searches whether the process selected in the workflow editing portion 1101 exists in the defined continuous processing operations. If the workflow editor determines that the selected process does not exist (NO in step S1204), no process having high relevance to the selected process exists, and the workflow editor accordingly sets only the one selected process as the search target, and the process advances to step S1207.

If the workflow editor determines that the selected process exists (YES in step S1204), the workflow editor determines, in step S1205, whether processes preceding and succeeding the selected process match the order and the processing type of the predefined continuous processing operation. If the workflow editor determines that the preceding and succeeding processes match the order and the processing type of the predefined continuous processing operation (YES in step S1205), the workflow editor sets the matching continuous processing operations as search targets to be searched from the history, and the process advances to step S1207.

If the workflow editor determines that they do not match the selected process (NO in step S1205), the workflow editor determines, in step S1206, whether the determination has been performed for all the predefined continuous processing operations. If the workflow editor determines that the determination has not been performed for all the processes (NO in step S1206), the process returns to step S1204.

If the workflow editor determines that the determination has been performed for all the predefined continuous processing operations (YES in step S1206), the workflow editor regards that neither the continuous processing operations having high relevance to the selected process nor the preceding and succeeding processes could be found and sets only the selected process as the search target. Then in step S1207, the workflow editor obtains the execution histories from each device that executes the search target processes.

In step S1208, the workflow editor merges the histories obtained from the plurality of devices and sorts the obtained histories in chronological order. This is the same process as that in step S1004 of FIG. 10 of the second embodiment. However, if the histories were obtained only from a single device, execution of the processing is not particularly necessary.

In step S1209, the workflow editor performs processing to search, from the histories, a portion that matches the series of processes, extract the corresponding settings, and set these settings. Since this process in step S1209 matches the series of processes from step S1005 to step S1012 of the second embodiment, a description thereof will be omitted.

In step S1210, the workflow editor determines whether editing of the workflow has been completed. If the workflow editor determines that the editing has not been completed (NO in step S1210), the process returns to step S1201. Otherwise (YES in step S1210), the editing processing of the workflow ends.

When processes having high relevance to the order of the workflow exist in the editing operation of processing settings, the settings can be set by determining the relevance of the processes and searching the processes that have the same processing order from the histories. Since determination is made automatically based on a predefined relevance without the user having to designate the highly relevant processes each time, the trouble of user instruction is eliminated and the settings can be quickly and easily set.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-224621, filed Nov. 4, 2014, which is hereby incorporated by reference herein in its entirety.

What is claimed is:

1. An information processing apparatus comprising:
a memory; and
a processor connected to the memory and configured to execute instructions that, when executed, cause the information processing apparatus to:
  edit a workflow formed by a first plurality of jobs which are to be processed in one or more job processing apparatuses of a plurality of job processing apparatuses,
  wherein the workflow includes a plurality of processes, associated with the first plurality of jobs, executed in a predesignated order, and
  wherein the workflow is edited at least to set settings for a process associated with a job of interest of the first plurality of jobs;
  obtain pieces of history information associated with a second plurality of jobs processed by the one or more job processing apparatuses of the plurality of job processing apparatuses;
  extract, from the second plurality of jobs, based at least on the obtained pieces of history information, a series of jobs having a job type arrangement in common with the job of interest of the first plurality of jobs forming the edited workflow;
  select a job from the extracted series of jobs, the selected job corresponding to the job of interest, so that the settings of the selected job can be selected as settings for the process associated with the job of interest;
  display settings set for the selected job; and
  set, based on a selection of the displayed settings, the settings of the process associated with the job of interest.

2. The apparatus according to claim 1, wherein the processor is further configured to execute instructions, that when executed, cause the information processing apparatus to obtain and merge the pieces of job history information from the one or more job processing apparatuses and sort the pieces of job history information in a processing order.

3. The apparatus according to claim 1, wherein the processor is further configured to execute instructions, that when executed, cause the information processing apparatus to extract, from the pieces of history information, a series of jobs in which processing is instructed by the same user in the pieces of history information.

4. The apparatus according to claim 1, wherein the processor is further configured to execute instructions, that when executed, cause the information processing apparatus to extract, from the pieces of history information, a series of jobs that have been processed within a predetermined time in the pieces of history information.

5. The apparatus according to claim 1, wherein the processor is further configured to execute instructions, that when executed, cause the information processing apparatus to accept selection of the job of interest.

6. The apparatus according to claim 5, wherein the processor is further configured to execute instructions, that when executed, cause the information processing apparatus to:
  accept, out of the plurality of jobs forming the workflow, selection of a plurality of continuous jobs including the job of interest, and
  extract, from the pieces of history information, a series of jobs having the job type arrangement in common with the plurality of selected jobs.

7. The apparatus according to claim 6, wherein the plurality of jobs are jobs that continue for not less than three jobs including the job of interest.

8. The apparatus according to claim 5, wherein the memory is further configured to hold predefined pieces of continuous job information; and
  wherein the processor is further configured to execute instructions, that when executed, cause the information processing apparatus to:
  in a case where the job type arrangement of the job of interest and at least one of the jobs preceding or succeeding the job of interest and the job type arrangement of the predefined pieces of continuous job information match, extract, from the pieces of history information, a series of jobs having a job type arrangement in common with the predefined pieces of continuous job information, and
  in a case where the job type arrangement of the job of interest and at least one of the jobs preceding or succeeding the job of interest and the job type arrangement of the predefined pieces of continuous job information do not match, extract, from the pieces of history information, a job of the same job type as the job of interest.

9. The apparatus according to claim 8, wherein the predefined pieces of continuous job information are jobs processed in an order of printout processing, scan and transmission in a single image processing apparatus.

10. The apparatus according to claim 8, wherein the predefined pieces of continuous job information are jobs processed in an order of scan and transmission by an image processing apparatus and file operation by the information processing apparatus.

11. The information processing apparatus according to claim 1, wherein the processor is further configured to execute instructions that, when executed, cause the information processing apparatus to:
   select a job preceding or succeeding a job of interest in the edited workflow;
   select, for each job in the extracted series of jobs, a corresponding job preceding or succeeding the each job in the extracted series of jobs;
   select, as the selected job corresponding to the job of interest, a job in the extracted series of jobs where the corresponding job preceding or succeeding the job corresponding to the job of interest has settings in common with the settings of the preceding or succeeding job of the job of interest.

12. A control method for an information processing apparatus, comprising:
   editing of a workflow formed by a first plurality of jobs which are to be processed in one or more job processing apparatuses of a plurality of job processing apparatuses,
   wherein the workflow includes a plurality of processes, associated with the first plurality of jobs, executed in a predesignated order, and
   wherein the workflow is edited at least to set settings for a process associated with a job of interest of the first plurality of jobs;
   obtaining pieces of history information associated with a second plurality of jobs processed by the one or more job processing apparatuses of the plurality of job processing apparatuses;
   extracting, from the second plurality of jobs, based at least on the obtained pieces of history information, a series of jobs having a job type arrangement in common with the job of interest of the first plurality of jobs forming the edited workflow;
   selecting a job from the extracted series of jobs, the selected job corresponding to the job of interest, so that the settings of the selected job can be selected as settings for the process associated with the job of interest; and
   displaying settings set for the selected job;
   setting, based on a selection of the displayed settings, the settings of the process associated with the job of interest.

13. A non-transitory computer readable storage medium storing a program for executing instructions that, when executed, cause an information processing apparatus to:
   edit a workflow formed by a first plurality of jobs which are to be processed in one or more job processing apparatuses of a plurality of job processing apparatuses,
   wherein the workflow includes a plurality of processes, associated with the first plurality of jobs, executed in a predesignated order, and
   wherein the workflow is edited at least to set settings for a process associated with a job of interest of the first plurality of jobs;
   obtain pieces of history information associated with a second plurality of jobs processed by the one or more job processing apparatuses of the plurality of job processing apparatuses;
   extract, from the second plurality of jobs, based at least on the obtained pieces of history information, a series of jobs having a job type arrangement in common with the job of interest of the first plurality of jobs forming the edited workflow;
   select a job from the extracted series of jobs, the selected job corresponding to the job of interest, so that the settings of the selected job can be selected as settings for the process associated with the job of interest;
   display settings set for the selected job; and
   set, based on a selection of the displayed settings, the settings of the process associated with the job of interest.

14. An information processing system including one or more job processing apparatuses, comprising:
   a memory; and
   a processor connected to the memory and configured to execute instructions that, when executed, cause the information processing apparatus to:
      edit a workflow formed by a first plurality of jobs which are to be processed in the one or more job processing apparatuses,
      wherein the workflow includes a plurality of processes, associated with the first plurality of jobs, executed in a predesignated order, and
      wherein the workflow is edited at least to set settings for a process associated with a job of interest of the first plurality of jobs;
      obtain pieces of history information associated with a second plurality of jobs processed by the one or more job processing apparatuses;
      extract, from the second plurality of jobs, based at least on the obtained pieces of history information, a series of jobs having a job type arrangement in common with the job of interest of the first plurality of jobs forming the edited workflow;
      select a job from the extracted series of jobs, the selected job corresponding to the job of interest, so that the settings of the selected job are selectable as settings for the process associated with the job of interest; and
      set, based on a selection of the displayed settings, the settings of the process associated with the job of interest.

15. An information processing apparatus comprising:
   a memory; and
   a processor connected to the memory and configured to execute instructions that, when executed, cause the information processing apparatus to:
      specify a workflow including a first plurality of one or more types of image processing jobs executed in a defined execution order;
      obtain history information which includes an execution history of a second plurality of one or more types of image processing jobs which have been executed in one or more image processing apparatuses;
      identify, in the obtained history information, settings associated with one or more image processing jobs of the second plurality of image processing jobs whose execution order, based on the types of the one or more image processing jobs of the second plurality of image processing jobs, corresponds to the execution order of one or more image processing jobs of the first plurality of image processing jobs, based on the types of the one or more image processing jobs of the first plurality of image processing jobs;

display the identified settings for the one or more image processing jobs of the second plurality of image processing jobs; and set, based on a selection of the displayed settings, settings for the one or more image processing jobs of the first plurality of image processing jobs.

\* \* \* \* \*